US009261894B2

(12) United States Patent
Stachniak

(10) Patent No.: US 9,261,894 B2
(45) Date of Patent: Feb. 16, 2016

(54) MULTIPLE DEGREES OF TRANSLATIONAL ADJUSTMENT PEDALS

(71) Applicant: Darryl S. Stachniak, Chicago, IL (US)

(72) Inventor: Darryl S. Stachniak, Chicago, IL (US)

(73) Assignee: Woodward, Inc., Fort Collins, CO (US)

(*) Notice: Subject to any disclaimer, the term of this patent is extended or adjusted under 35 U.S.C. 154(b) by 119 days.

(21) Appl. No.: 13/791,221

(22) Filed: Mar. 8, 2013

(65) Prior Publication Data

US 2014/0251066 A1   Sep. 11, 2014

(51) Int. Cl.
| | |
|---|---|
| G05G 9/00 | (2006.01) |
| G05G 1/30 | (2008.04) |
| B64C 13/04 | (2006.01) |
| G05G 1/405 | (2008.04) |
| B64C 13/06 | (2006.01) |

(52) U.S. Cl.
CPC .............. *G05G 1/405* (2013.01); *B64C 13/06* (2013.01); *Y10T 74/20528* (2015.01)

(58) Field of Classification Search
CPC ........... G05G 1/405; G05G 1/40; G05G 1/30; B64C 13/06; Y10T 74/20528
USPC ............ 74/478, 512, 513, 514, 560; 244/220, 244/221, 231, 234, 235
IPC ..................................... G05G 1/30, 1/40, 1/405
See application file for complete search history.

(56) References Cited

U.S. PATENT DOCUMENTS

| | | | |
|---|---|---|---|
| 2,516,397 A | 7/1950 | Kress et al. | |
| 4,192,476 A | 3/1980 | Byers | |
| 4,470,570 A * | 9/1984 | Sakurai et al. | 244/235 |
| 4,484,722 A * | 11/1984 | Larson et al. | 244/235 |
| 4,848,708 A | 7/1989 | Farrell et al. | |
| 5,056,742 A | 10/1991 | Sakurai | |
| 5,583,407 A * | 12/1996 | Yamaguchi | 318/551 |
| 5,632,183 A * | 5/1997 | Rixon et al. | 74/512 |
| 6,070,489 A * | 6/2000 | Ananthasivan et al. | 74/512 |
| 6,431,304 B1 * | 8/2002 | Smythe | 180/334 |
| 6,877,394 B2 * | 4/2005 | Massey et al. | 74/512 |
| 6,883,398 B2 * | 4/2005 | Kojima et al. | 74/564 |
| 6,918,316 B2 | 7/2005 | Johansson et al. | |
| 6,962,094 B2 | 11/2005 | Porter et al. | |
| 7,424,836 B2 * | 9/2008 | Takai | 74/512 |
| 2003/0110879 A1 | 6/2003 | Massey, III et al. | |
| 2004/0040403 A1 | 3/2004 | Hayashihara et al. | |
| 2011/0108674 A1 | 5/2011 | Gardner | |

* cited by examiner

*Primary Examiner* — Adam D Rogers
(74) *Attorney, Agent, or Firm* — Reinhart Boerner Van Deuren P.C.

(57) ABSTRACT

A pedal system for an aircraft comprising a pedal and a pedal mounting mechanism is provided. The pedal is configured for manipulation through at least one operational degree of freedom by a pilot to provide control inputs to the aircraft. The pedal mounting mechanism is configured for supporting the pedal within a cockpit of the aircraft for manipulation by the pilot. The pedal mounting mechanism provides at least two adjustment degrees of freedom for adjusting the position of the pedal within the cockpit.

13 Claims, 4 Drawing Sheets

US 9,261,894 B2

MULTIPLE DEGREES OF TRANSLATIONAL ADJUSTMENT PEDALS

FIELD OF THE INVENTION

This invention generally relates to cockpit pedals for aircraft and particularly cockpit pedals having positional adjustment.

BACKGROUND OF THE INVENTION

Pedals in aircrafts are manipulated by a pilot's legs to control some aspect of the aircraft, such as for example the rudder or breaks of the aircraft. Currently, pedals have a single degree of freedom of adjustment within the cockpit to adjust for pilot comfort and optimal operating position. There are two typical philosophies related to adjustment of the pedals.

The first philosophy requires that the pedals remain substantially at a fixed distance above the floor of the cockpit. Typically, the adjustability will only be toward and away from the pilot's seat. In this configuration, the pilot's heel will be able to rest on the floor while at the same time the arch of the pilot's foot rests on the cylindrical part of the pedal no matter the position of the pedal.

The second philosophy transitions the pedals away from the floor as the pedals are adjusted aft (i.e. toward the pilot's seat). This philosophy is based on the assumption that the shorter pilot will have the seat raised and thus needs the pedals higher and closer to his body. Adjustment may also require rotation of the pedal toes in the forward motion direction (i.e. away from the seat) as the pedals move toward the seat to accommodate the shorter pilot's more vertical attitude.

Another problem with pedals in an aircraft is that the pedals are only used for a very small percentage of the total aircraft flying time. However, the pedals take up a large portion of the leg space in the cockpit causing discomfort for the pilot when the pedals are not in use.

The present invention provides improvements over the current state of the art of pedals for aircrafts.

BRIEF SUMMARY OF THE INVENTION

Embodiments of the present invention provide new and improved pedal systems for aircrafts. More particularly, embodiments of the present invention provide new and improved pedal systems for aircrafts that allow for improved adjustability within the cockpit relative to the seat of the pilot so as to provide improved comfort and positioning for different pilots and particularly different sized pilots.

In a particular embodiment, a pedal system for an aircraft comprising a pedal and a pedal mounting mechanism is provided. The pedal is configured for manipulation through at least one operational degree of freedom by a pilot to provide control inputs to the aircraft. The pedal mounting mechanism is configured for supporting the pedal within a cockpit of the aircraft for manipulation by the pilot. The pedal mounting mechanism provides at least two adjustment degrees of freedom for adjusting the position of the pedal within the cockpit.

In one embodiment, the at least two adjustment degrees of freedom includes a first adjustment degree of freedom that is a rotational degree of freedom and a second adjustment degree of freedom that is a translational degree of freedom. Alternative embodiments may include multiple rotational adjustment degrees of freedom and/or multiple translational adjustment degrees of freedom.

In one embodiment, the pedal mounting mechanism includes a main support, and a pivoting support body. The pivoting support body is operably coupled to the main support for rotation about a support body axis of rotation. The pivoting support body is operably coupled between the main support and the pedal. The pedal is operably coupled to the pivoting support body. The pedal is operably mounted to the pivoting support body for translational motion along the pivoting support body.

In one embodiment, a first actuator is coupled to the pivoting support body configured for driving the pivoting support body relative to the main support about the support body axis of rotation. In one embodiment, this actuator raises and lowers the pedal relative to the floor of the aircraft/cockpit.

In one embodiment, a second actuator is operably coupled to the pedal. The second actuator is configured for translating the pedal along the pivoting support body. In one embodiment, this actuator transitions the pedal toward and away from the seat of the pilot (i.e. fore and aft).

In one embodiment, these first and second actuators are linear actuators.

In one embodiment, the system includes an adjustable coupling operably coupling the pedal to the pivoting support body. The adjustable coupling provides a third adjustment degree of freedom for adjusting the position of the pedal that is a rotational degree of freedom about a pedal axis of rotation. Alternative embodiments can have a linear third adjustment degree of freedom.

In a more particular embodiment, the pedal axis of rotation and the support body axis of rotation are substantially parallel to one another.

In a further embodiment, a pedal system for use in an aircraft cockpit having a pilot seat and a flight deck floor is provided. The pedal system includes a pedal and a pedal mounting mechanism. The pedal is configured for manipulation through at least one operational degree of freedom by a pilot to provide control inputs to the aircraft. The pedal mounting mechanism is configured for supporting the pedal within the cockpit of the aircraft relative to the pilot seat and flight deck floor for manipulation by the pilot. The pedal mounting mechanism provides a first adjustment degree of freedom for adjusting the position of pedal generally toward and away from the seat and a second adjustment degree of freedom for adjusting the position of the pedal generally toward and away from the flight deck floor.

In one embodiment, one of the first and second adjustment degrees of freedom is a rotational degree of freedom and the other one of the first and second adjustment degrees of freedom is a translational degree of freedom.

In one embodiment, the pedal mounting mechanism includes a main support and a pivoting support body. The pivoting support body is operably coupled to the main support for rotation about a support body axis of rotation. The pivoting support body is operably coupled between the main support and the pedal. The pedal is operably coupled to the pivoting support body. The pedal is operably mounted to the pivoting support body for translational motion along the pivoting support body.

In one embodiment, the system includes a first actuator coupled to the pivoting support body configured for driving the pivoting support body relative to the main support about the support body axis of rotation. In a more particular embodiment, the system includes a second actuator operably coupled to the pedal. The second actuator is configured for translating the pedal along the pivoting support body. The first and second actuators may be linear actuators.

In one embodiment, the system includes an adjustable coupling operably coupling the pedal to the pivoting support body. The adjustable coupling providing a third adjustment degree of freed for adjusting the position of the pedal that is a rotational degree of freedom about a pedal axis of rotation.

In one embodiment, the pedal axis of rotation and the support body axis of rotation are substantially parallel to one another.

In a further embodiment, the system includes a controller operably coupled to the first and second actuators. The controller is configured to control the first and second actuators to drive the pedal between a pilot operational set position and a retracted position having a different position relative to the flight deck floor and the pilot seat.

In a more particular embodiment, the refracted position provides increased space for the pilot to extend his legs under the pedals as compared to the pilot operational set position.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
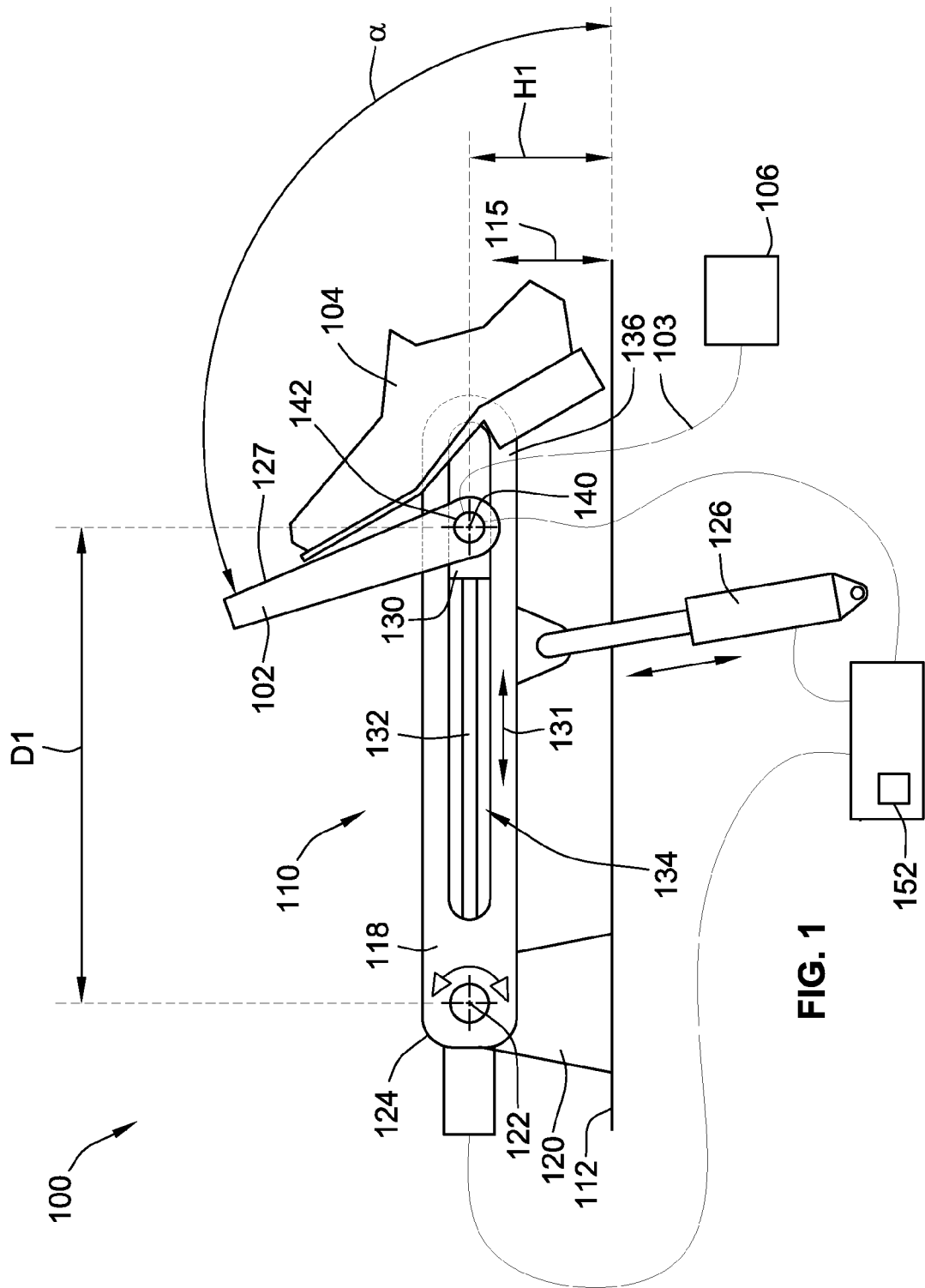
FIG. 1 is a simplified schematic illustration of a pedal system for an aircraft in a first position.

FIG. 1 illustrates a simplified embodiment of a pedal system 100 for use in an aircraft. The pedal system 100 includes one or more pedals 102 (only one shown) that can be manipulated by a pilot (illustrated by foot 104) to provide an input control signal to controlled device 106 of the aircraft. These controlled devices 106 could, for example, be a braking system or a rudder system for the aircraft. However, other controlled systems and devices are contemplated. While only a single controlled device 106 is shown in simplified form, it is contemplated that the pedal system could control multiple devices such as both the rudder and the braking system.

The pedal system 100 may be used with any type of connection system 103 that couples the pedals 102 to the controlled device 106. For instance, a mechanical system where the pedals 102 are coupled to the controlled device 106 through a plurality of cables and pulleys or rods may be used. Alternatively, a fly-by-wire type system may be used where a sensor senses the degree of motion of the pedals 102 and converts that to a corresponding electrical signal which is used by an actuation system of the controlled device 106 to control the degree of manipulation of the controlled device 106 (e.g. the amount of braking force or the degree of change in position of the rudder).

The pedal system 100 includes a pedal mounting mechanism 110 that supports the pedals 102 within the cockpit and particularly within a leg space of the cockpit forward of the pilot's seat within the cockpit. The pedal mounting mechanism 110 is also configured to allow the user to manipulate the pedals 102 to provide the operational motion of the pedals 102 to control the controlled device 106. The pedal mounting mechanism 110 is also configured to allow adjustment of the position of the pedals 102 within the cockpit relative to the floor 112 and the pilot's seat (not shown in FIG. 1) so as to improve the pilots comfort and by positioning the pedals 102 in the optimal operating position.

The pedal system 100 provides multiple adjustment degrees of freedom within the cockpit for adjusting the position of the pedals 102. An "adjustment degree of freedom" as used herein shall not include a degree of freedom through which the pilot manipulates the pedals 102 during operation of the pedals 102 to provide a control input to the controlled devices 106. As such, a degree of freedom through which the pedal moves when the pilot desires to apply braking or to change the position of the rudder, for example, shall not be considered an adjustment degree of freedom. This type of motion or degree of freedom would be considered an "operational degree of freedom."

In the illustrated embodiment, the pedal mounting mechanism 110 includes a pivoting support body 118 that is operably coupled to a main support 120. The pivoting support body 118 is operably coupled to the main support 120 such that the pivoting support body 118 can rotate relative to the main support 120 about support body axis of rotation 122. The coupling between the main support 120 and the pivoting support body 118 is provided proximate a first end 124 of the pivoting support body 118.

Figure 2:
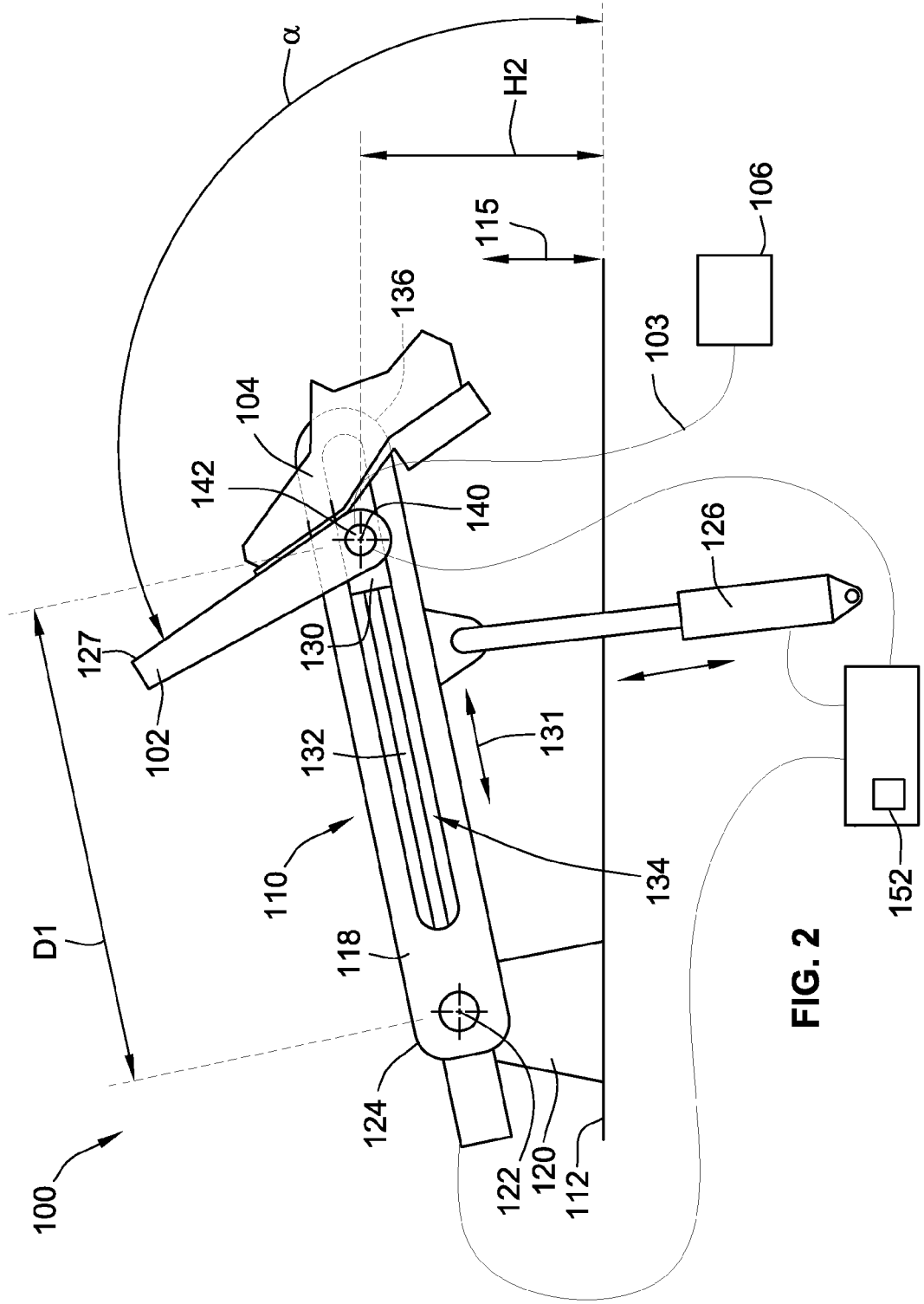
FIG. 2 is a simplified schematic illustration of a pedal system for an aircraft in a second position.

An actuator illustrated in the form of first linear actuator 126 is operably coupled to the pivoting support body 118. The linear actuator 126 is configured to drive the pivoting support body 118 about the support body axis of rotation 122. FIG. 1 illustrates the first linear actuator 126 generally retracted such that pedal 102 is positioned adjacent to floor 112. FIG. 2 illustrates the linear actuator 126 extended such that pedal 102 is positioned away from the floor 112 as compared to its position in FIG. 1. This first adjustment degree of freedom allows for adjusting the vertical position of the pedals 102 within the cockpit relative to the floor 112 (illustrated by arrow 115). In. FIG. 1, the pedals 102 are positioned for use by a pilot who desires to be able to rest his foot on the floor 112. FIG. 2 illustrates the pivoting support body 118 transitioned away from floor 112 by extension of the first linear actuator 126. As illustrated in FIG. 2, the pilot's heel is lifted away from the floor 112 as opposed to FIG. 1, where the pilot's heel is close to the floor 112 and may be rested thereon. The pedal position of FIG. 2 may be used, for example, for a shorter pilot than for the pilot who may use the pedal position of FIG. 1.

While the primary motion of the pedals 102 due to extension and retraction of first linear actuator 126 appears to be vertical relative to floor 112 (see comparison of heights H1 and H2 of FIGS. 1 and 2), a portion of the motion is also angular due to the pivoting action of the pivoting support body 118 rotating about support body axis of rotation 122. This also causes the angle α of the contact face 127 relative to floor 112 to change. The longer the distance D1 is between the pedals 102 and the support body axis of rotation 122 results in reduced change in the angle α of the contact face 127 of the pedals 102 relative to the floor for a given change in vertical height H1, H2 relative to floor 112.

The pedals 102 are operably mounted to the pivoting support body 118 such that the pivoting support body 118 is mechanically interposed between the pedals 102 and the main support 120. The pedals 102 are also mounted to the pivoting support body 118 for translational motion (illustrated by arrow 131) along the pivoting support body 118 to provide a second adjustment degree of freedom.

The pedals 102 are mounted to a mounting block 130 that can be translated along the pivoting support body 118 by a second linear actuator 132. The mounting block 130 is configured to slide along the pivoting support body 118 to adjust the fore-aft position of the pedals 102 (e.g. to adjust the position of the pedals 102 toward or away from the pilot's seat). In the illustrated embodiment, the mounting block 130 is positioned within a slot 134 formed in the pivoting support body 118. The second linear actuator 132 drives the mounting block 130 toward or away from the first end 124 of the pivoting support body 118 and consequently away from or toward the main support 120. This motion provides a translational adjustment degree of freedom. The mounting block 130 may be mounted on linear guides or rollers to reduce friction and improve operation of the system.

Figure 3:
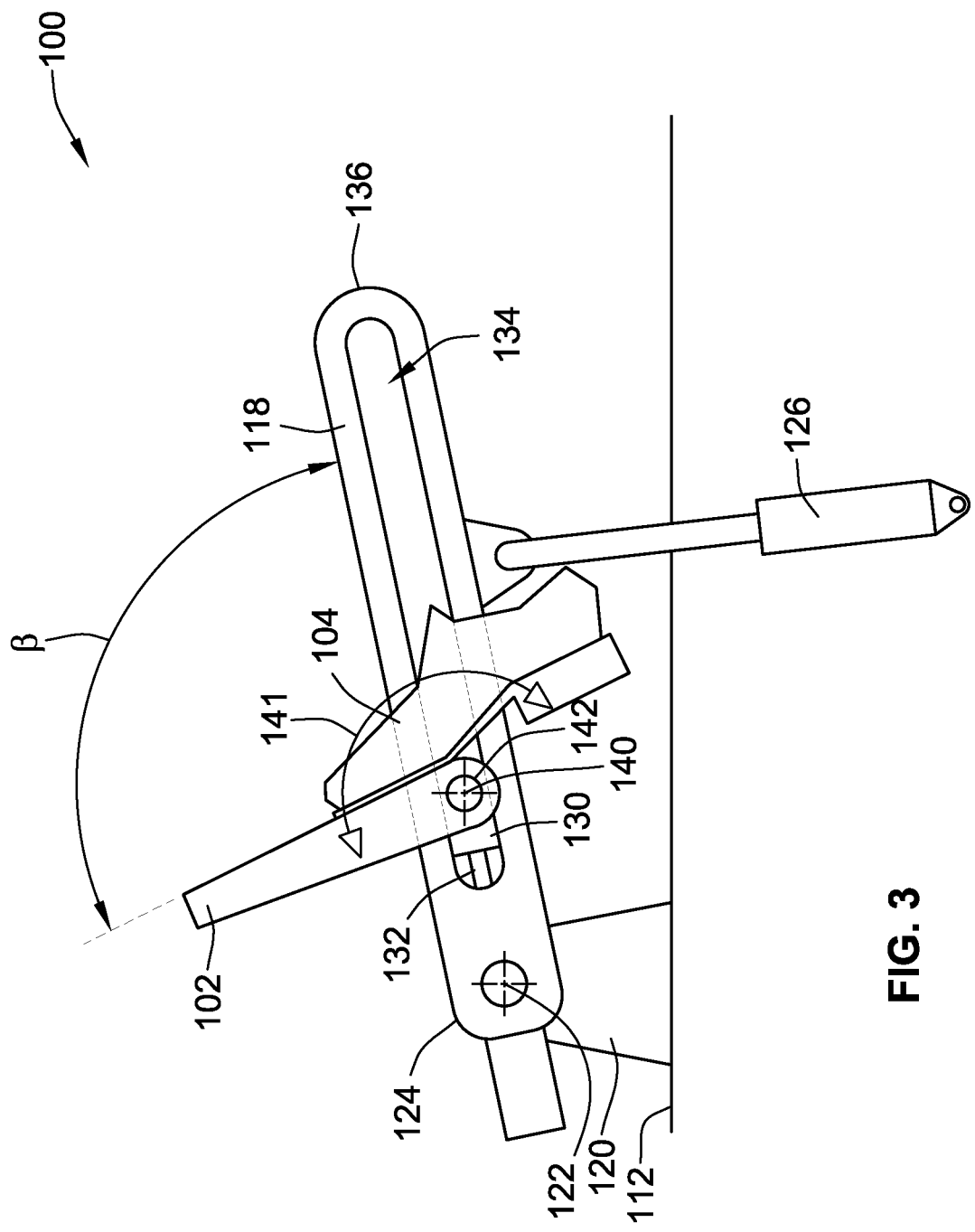
FIG. 3 is a simplified schematic illustration of a pedal system for an aircraft in a third position.

When the mounting block 130 and consequently the pedals 102 are located proximate the second end 136 of the pivoting support body 118 (e.g. FIGS. 1 and 2), the amount of vertical motion of the pedals 102 increases when the first linear actuator 126 is extended or retracted as compared to when the mounting block 130 is closer to the main support 120 (e.g. FIG. 3) for the same amount of extension of the first linear actuator 126.

In this embodiment, a third adjustable degree of freedom is provided. The mounting block 130 provides an adjustable coupling that allows for adjusting the angular orientation of the pedals 102 relative to the pivoting support body 118. More particularly, the pedals 102 can be angularly adjusted about pedal axis of rotation 140 (illustrated by arrow 141 in FIG. 3). The pedals 102 can be rotated about shaft 142 which is generally coaxial with pedal axis of rotation 140 so as to adjust the angle β of the pedals 102 (i.e. the contact face 127) relative to the pivoting support body 118 (see e.g. FIG. 3). A third actuator may be provided between the mounting block 130 and the pedals 102 to adjust the angle β of the pedals 102 relative to the pivoting support body 118. In the illustrated embodiment, the pedal axis of rotation 140 is parallel to the support body axis of rotation 122.

While the illustrated embodiment has the main support 120 positioned adjacent the floor 112 such that the pivoting support body 118 runs substantially horizontal. In alternative embodiments, the main support 120 could be connected under a control panel of the aircraft such that the pivoting support body 118 hangs vertically downward from the main support 120.

In operation, the pilot will press on the pedals 102 to cause the pedal 102 to move relative to the pedal mounting structure, (e.g. the pivoting support body 118) so as to provide a control input to control the operation of controlled device 106. This may cause translational motion of the pedal 102 along the pivoting support body 118, rotational motion relative to the mounting block 130, or a combination of both motions depending on the configuration of the operational degrees of freedom of the pedal system 100.

Figure 4:
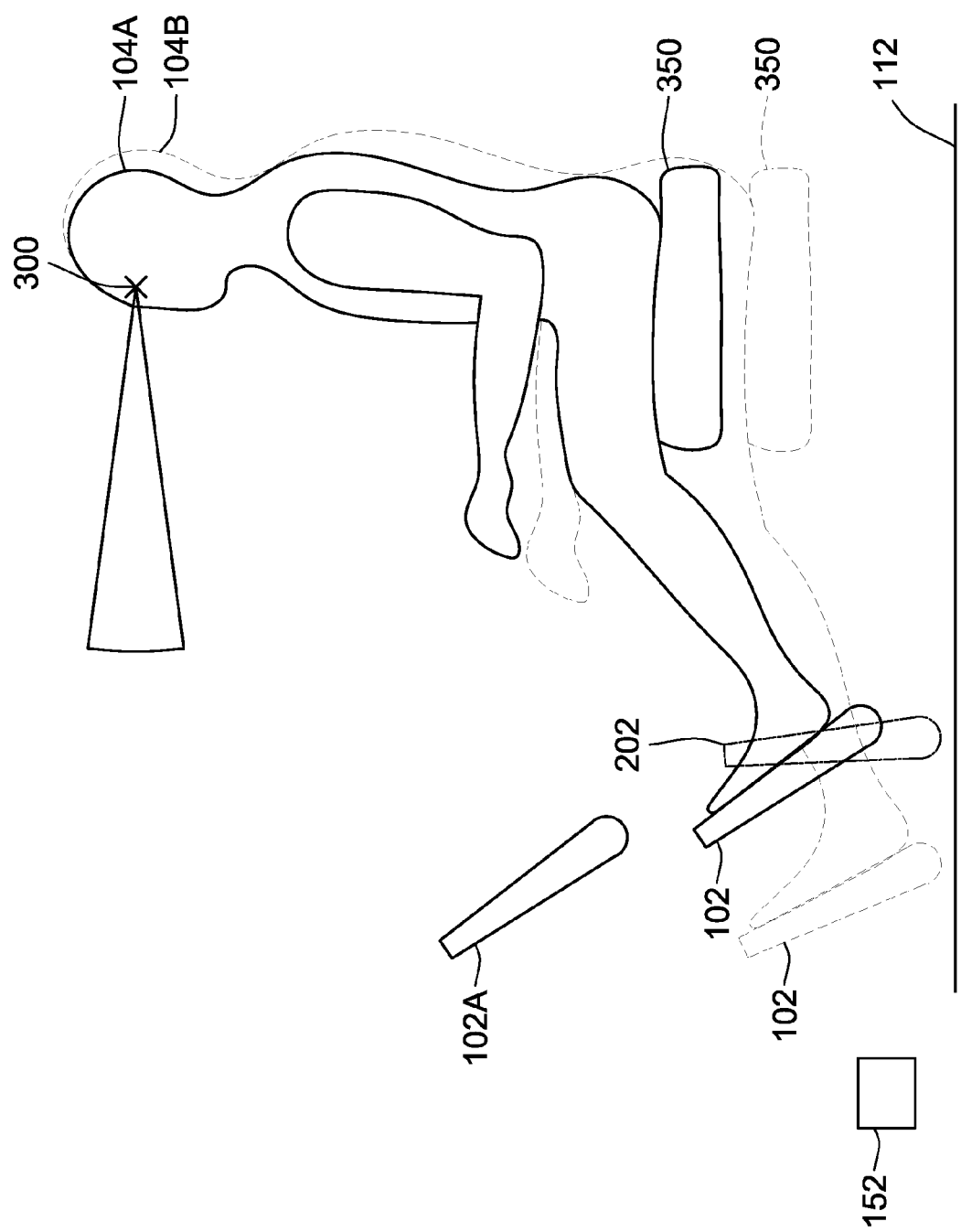
FIG. 4 is a simplified schematic illustration of a pedal system for an aircraft illustrating a design eye concept.

Cockpits are typically designed using a conventional design philosophy that dictates an optimal view out of the aircraft that is based on an optimal eye position of the pilot. This optimal eye position 300 is illustrated in FIG. 4. No matter the height of the pilot, it is desired that the pilot's eye is positioned proximate this optimal eye position 300.

Therefore, shorter pilots 104A (illustrated in solid lines) are required to raise the height of the seat 350 as compared to taller pilots 104B (illustrated in dashed lines), as illustrated in FIG. 4. Unfortunately, this requires the pedals 102 to be brought closer to the pilot's seat 350. FIG. 4 illustrates a conventional pedal 202 that only has a single adjustment degree of freedom (horizontal and parallel to the floor). This illustrates how the single adjustment degree of freedom pedal does not accommodate shorter pilots with the seat 350 raised. However, FIG. 4 illustrates that by using multiple adjustment degrees of freedom, pedals 102 can be translated both towards the pilots seat 350 as well as vertically upwards and away from floor 112 so as to accommodate the shorter pilot while still allowing the shorter pilot 104A to be positioned at the proper optimal eye position 300.

A position where the pilot desires the pedals 102 to be positioned when the pedals 102 are desired to be used can be referred to as a "pilot operational set position." It is a feature of some embodiments, that the pedal system 100 can also be configured to drive the pedals 102 between desired pilot operational set positions and a retracted position. This retracted position of pedals 102 can be user programmed into a controller 152 operably coupled to the actuators 126, 132 to automatically transition from the pilot operational set position to the retracted position. The refracted position (illustrated by pedal 102A in FIG. 4) can allow a pilot to stretch its legs without interference from the pedals. Push of the same or other button can then cause the controller 152 to automatically drive the pedal back to the previous or another pilot operational set position. The retracted position increases the volume of the area generally bounded by seat 350, below pedal 102A and above floor 112.

With reference to FIG. 1, the pedal system 100 is preferably configured to provide at least two operational degrees of freedom so as to be able to control two different devices of the aircraft. Typically, at least one operational degree of freedom will be for controlling breaking and one operational degree of freedom will be for control of the rudder.

Typically, first one of the operational degrees of freedom will be a pivoting motion of pedal 102 about an operational axis of rotation that is co-axial with pedal axis of rotation 140. As such, a pilot could provide one control input signal by rotating the pedal 102 about such an operational axis of rotation.

A second one of the operational degrees of freedom is typically a substantially translational motion of the pedals 102 fore and aft (i.e. toward and away from the seat of the aircraft). This second operational degree of freedom may be generally parallel to the adjustment degree of freedom controlled by second actuator 132. This could be implemented by a mounting structure that allows for motion of the mounting block 130 relative to second actuator 132, motion of the pedals 102 relative to mounting block 130 or motion of the combination of the actuator 132, pedal 102 and mounting block 130 relative to the rest of the aircraft. Other options for allowing the operational degrees of freedom are also contemplated.

Typically, the operational degrees of freedom will include a biasing mechanism to return the pedals 102 to a standard home position when force applied by the pilot's feet is removed. The biasing mechanism may also provide resistance against motion of the pedals through the degrees of freedom to provide tactile feedback to the pilot.

The adjustment degrees of freedom allow for adjustment of the standard home position of the pedals.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pedal system for an aircraft comprising:
    a pedal configured for manipulation through at least one operational degree of freedom by a pilot to provide control inputs to the aircraft;
    a pedal mounting mechanism configured for supporting the pedal within a cockpit of the aircraft for manipulation by the pilot, the pedal mounting mechanism providing at least two adjustment degrees of freedom for adjusting the position of the pedal;
    wherein the at least two adjustment degrees of freedom includes a first adjustment degree of freedom that is a rotational degree of freedom and a second adjustment degree of freedom that is a translational degree of freedom.

2. A pedal system for an aircraft comprising:
    a pedal configured for manipulation to provide control inputs to the aircraft;
    a pedal mounting mechanism supporting the pedal for manipulation through at least one operational degree of freedom by a pilot, the pedal mounting mechanism providing first and second adjustment degrees of freedom for adjusting the position of the pedal, the pedal mounting mechanism including:
        a main support;
        a pivoting support body operably coupled to the main support for rotation about a support body axis of rotation providing the first adjustment degree of freedom, the pivoting support body being operably coupled between the main support and the pedal, the pedal being operably coupled to the pivoting support body;
        a first actuator coupled to the pivoting support body configured for driving the pivoting support body relative to the main support about the support body axis of rotation;
        the pedal being operably mounted to the pivoting support body for translational motion along the pivoting support body providing the second adjustment degree of freedom; and
        a second actuator operably coupled to the pedal, the second actuator configured for translating the pedal along the pivoting support body.

3. The pedal system of claim 2, wherein the first and second actuators are linear actuators.

4. A pedal system for an aircraft comprising:
    a pedal configured for manipulation through at least one operational degree of freedom by a pilot to provide control inputs to the aircraft;
    a pedal mounting mechanism configured for supporting the pedal within a cockpit of the aircraft for manipulation by the pilot, the pedal mounting mechanism providing at least two adjustment degrees of freedom for adjusting the position of the pedal;
    wherein the pedal mounting mechanism includes:
        a main support,
        a pivoting support body operably coupled to the main support for rotation about a support body axis of rotation, the pivoting support body being operably coupled between the main support and the pedal, the pedal being operably coupled to the pivoting support body;
    wherein the pedal is operably mounted to the pivoting support body for translational motion along the pivoting support body; and
    further including an adjustable coupling operably coupling the pedal to the pivoting support body, the adjustable coupling providing a third adjustment degree of freedom for adjusting the position of the pedal that is a rotational degree of freedom about a pedal axis of rotation.

5. The pedal system of claim 4, wherein the pedal axis of rotation and the support body axis of rotation are substantially parallel to one another.

6. A pedal system for use in an aircraft cockpit having a pilot seat and a flight deck floor, the pedal system comprising:
    a pedal configured for manipulation through at least one operational degree of freedom by a pilot to provide control inputs to the aircraft;
    a pedal mounting mechanism configured for supporting the pedal within the cockpit of the aircraft relative to the pilot seat and flight deck floor for manipulation by the pilot, the pedal mounting mechanism providing a first adjustment degree of freedom for adjusting the position of the pedal toward and away from the seat and a second adjustment degree of freedom for adjusting the position of the pedal toward and away from the flight deck floor;
    wherein the pedal mounting mechanism includes:
        a main support,
        a pivoting support body operably coupled to the main support for rotation about a support body axis of rotation, the pivoting support body being operably coupled between the main support and the pedal, the pedal being operably coupled to the pivoting support body;
    wherein the pedal is operably mounted to the pivoting support body for translational motion along the pivoting support body;

further including an adjustable coupling operably coupling the pedal to the pivoting support body, the adjustable coupling providing a third adjustment degree of freedom for adjusting the position of the pedal that is a rotational degree of freedom about a pedal axis of rotation.

7. The pedal system of claim 6, wherein the pedal axis of rotation and the support body axis of rotation are substantially parallel to one another.

8. A pedal system for use in an aircraft cockpit having a moveable pilot seat and a flight deck floor, the pedal system comprising:
- a pedal configured for manipulation through at least one operational degree of freedom by a pilot to provide control inputs to the aircraft;
- a pedal mounting mechanism configured for supporting the pedal within the cockpit of the aircraft relative to the pilot seat and flight deck floor for manipulation by the pilot, the pedal mounting mechanism providing a first adjustment degree of freedom for adjusting the position of the pedal toward and away from the seat and a second adjustment degree of freedom for adjusting the position of the pedal toward and away from the flight deck floor, the pedal mounting mechanism including:
  - a main support,
  - a pivoting support body operably coupled to the main support for rotation about a support body axis of rotation, the pivoting support body being operably coupled between the main support and the pedal, the pedal being operably coupled to the pivoting support body;
  - a first actuator coupled to the pivoting support body configured for driving the pivoting support body relative to the main support about the support body axis of rotation;
  - the pedal being operably mounted to the pivoting support body for translational motion along the pivoting support body.

9. The pedal system of claim 8, wherein one of the first and second adjustment degrees of freedom is a rotational degree of freedom and the other one of the first and second adjustment degrees of freedom is a translational degree of freedom.

10. The pedal system of claim 8, further comprising a second actuator operably coupled to the pedal, the second actuator configured for translating the pedal along the pivoting support body.

11. The pedal system of claim 10, wherein the first and second actuators are linear actuators.

12. The pedal system of claim 10, further comprising a controller operably coupled to the first and second actuators, the controller configured to control the first and second actuators to drive the pedal between a pilot operational set position and a retracted position having a different position relative to the flight deck floor and the pilot seat.

13. The pedal system of claim 12, wherein the retracted position provides increased space for the pilot to extend their legs under the pedal as compared to the pilot operational set position.

* * * * *